US010609531B2

(12) United States Patent
Hamilton et al.

(10) Patent No.: US 10,609,531 B2
(45) Date of Patent: *Mar. 31, 2020

(54) METHODS, APPARATUS AND SYSTEM FOR MOBILE PIGGYBACKING

(71) Applicant: EBAY INC., San Jose, CA (US)

(72) Inventors: Scot Fraser Hamilton, Dublin, CA (US); Ladd Van Tol, Portland, OR (US); Luke Shardlow, Wayland, MA (US); Jonathan David Chard, Portland, OR (US); Matthew Olson, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,412

(22) Filed: Apr. 10, 2019

(65) Prior Publication Data

US 2019/0239045 A1 Aug. 1, 2019

Related U.S. Application Data

(63) Continuation of application No. 15/903,078, filed on Feb. 23, 2018, now Pat. No. 10,278,040, which is a continuation of application No. 15/645,737, filed on Jul. 10, 2017, now Pat. No. 9,936,332, which is a continuation of application No. 15/255,629, filed on Sep. 2, 2016, now Pat. No. 9,706,332, which is a
(Continued)

(51) Int. Cl.
H04W 4/50 (2018.01)
H04L 29/08 (2006.01)
H04L 29/06 (2006.01)
G06F 3/14 (2006.01)
H04W 76/10 (2018.01)

(52) U.S. Cl.
CPC ............ H04W 4/50 (2018.02); G06F 3/1454 (2013.01); H04L 67/025 (2013.01); H04L 67/38 (2013.01); G09G 2370/022 (2013.01); G09G 2370/027 (2013.01); H04W 76/10 (2018.02)

(58) Field of Classification Search
CPC .................................................. H04L 67/025
See application file for complete search history.

(56) References Cited

U.S. PATENT DOCUMENTS 7,539,733 B2 5/2009 Mohammed et al.
8,239,840 B1 8/2012 Czymontek
8,595,321 B2 11/2013 Hoang
(Continued)

OTHER PUBLICATIONS

Applicant Initiated Interview Summary received for U.S. Appl. No. 14/075,582, dated Mar. 29, 2016, 3 pages.
(Continued)

*Primary Examiner* — Lashonda T Jacobs
(74) *Attorney, Agent, or Firm* — Merchant & Gould P.C.

(57) ABSTRACT

Methods, systems, and apparatus for providing assistance to a user of a mobile application are described. A request for assistance from the user is detected and a request is issued to a remote device for establishment of a remote assistance session. Information describing a state of the mobile device is periodically transmitted to the remote device and one or more commands may be received from the remote device. The commands may be executed on the mobile device.

20 Claims, 7 Drawing Sheets

Related U.S. Application Data continuation of application No. 14/075,582, filed on Nov. 8, 2013, now Pat. No. 9,436,428.

(60) Provisional application No. 61/724,180, filed on Nov. 8, 2012.

(56) References Cited

U.S. PATENT DOCUMENTS

| | | | |
|---|---|---|---|
| 9,436,428 B2 | 9/2016 | Hamilton et al. | |
| 9,706,332 B2 | 7/2017 | Hamilton et al. | |
| 9,936,332 B2 | 4/2018 | Hamilton et al. | |
| 10,278,040 B2 | 4/2019 | Hamilton et al. | |
| 2008/0270612 A1 | 10/2008 | Malakapalli et al. | |
| 2009/0164899 A1 | 6/2009 | Hernacki et al. | |
| 2009/0247136 A1 | 10/2009 | Srinivasan et al. | |
| 2010/0238194 A1* | 9/2010 | Roach, Jr. | H04M 3/42 345/629 |
| 2011/0213821 A1 | 9/2011 | Gentile et al. | |
| 2011/0283296 A1* | 11/2011 | Chun | H04M 1/72522 719/318 |
| 2012/0323553 A1 | 12/2012 | Aslam et al. | |
| 2013/0332996 A1 | 12/2013 | Fiala et al. | |
| 2014/0020062 A1 | 1/2014 | Tumula et al. | |
| 2014/0129612 A1 | 5/2014 | Hamilton et al. | |
| 2014/0295795 A1* | 10/2014 | Miyazaki | H04W 12/06 455/411 |
| 2015/0156115 A1* | 6/2015 | Buyukkoc | H04W 4/00 709/223 |
| 2016/0094654 A1* | 3/2016 | Raman | G06F 16/5866 715/733 |
| 2016/0373883 A1 | 12/2016 | Hamilton et al. | |
| 2017/0311111 A1 | 10/2017 | Hamilton et al. | |
| 2018/0184276 A1 | 6/2018 | Hamilton et al. | |

OTHER PUBLICATIONS

Applicant Initiated Interview Summary received for U.S. Appl. No. 14/075,582, dated Nov. 16, 2015, 3 pages.
Final Office Action received for U.S. Appl. No. 14/075,582, dated Feb. 11, 2016, 11 pages.
Non-Final Office Action received for U.S. Appl. No. 14/075,582, dated Sep. 1, 2015, 9 pages.
Notice of Allowance received for U.S. Appl. No. 14/075,582, dated May 5, 2016, 8 pages.
Response to Final Office Action filed on Apr. 14, 2016, for U.S. Appl. No. 14/075,582, dated Feb. 11, 2016, 10 pages.
Response to Non-Final Office Action filed on Nov. 24, 2015, for U.S. Appl. No. 14/075,582, dated Sep. 1, 2015, 9 pages.
Applicant Initiated Interview Summary received for U.S. Appl. No. 15/255,629, dated Jan. 18, 2017, 3 pages.
Notice of Allowance received for U.S. Appl. No. 15/255,629, dated Mar. 10, 2017, 6 pages.
Pre-Interview First Office Action received for U.S. Appl. No. 15/255,629, dated Dec. 16, 2016, 4 pages.
Preliminary Amendment filed for U.S. Appl. No. 15/255,629, filed Oct. 14, 2016, 7 pages.
Response to Pre Interview First Office Action Communication filed on Feb. 16, 2017, for U.S. Appl. No. 15/255,629, dated Dec. 16, 2016, 7 pages.
Notice of Allowance received for U.S. Appl. No. 15/645,737, dated Nov. 22, 2017, 6 pages.
Pre-Interview First Office Action received for U.S. Appl. No. 15/645,737 dated Oct. 19, 2017, 5 pages.
Preliminary Amendment filed for U.S. Appl. No. 15/645,737, filed Jul. 25, 2017, 6 pages.
Android Developers, "Android Debug Bridge", Retrieved from the Internet: URL: <https://web.archive.org/web/20110305191101/http://developer.android.com/guide/developing/tools/adb.html>, Mar. 5, 2011, 11 pages.
Cozma, "How to Control your Android via PC", REtrieved from the Internet: URL: <https://www.cnet.com/how-to/how-to-control-your-android-via-pc/>, Dec. 12, 2011, 4 pages.
Damien, "Remote Web Desktop Lets You Control Your Android Phone From Desktop", Retrieved from the Internet: URL: <https://www.maketecheasier.com/remote-web-desktop-lets-you-control-your-android-phone-from-desktop/>, May 24, 2011, 6 pages.
Fitzpatrick, "How to Remote View and Control Your Android Phone", Retrieved from the Internet: URL:<https://www.howtogeek.com/howto/42491/how-to-remote-view-and-control-your-android-phone/>, Feb. 2, 2011, 11 pages.
Google Project Hosting, "Android Screencast", Retrieved from the Internet: URL:< https://web.archive.org/web/20110822024704/http://code.google.com:80/p/androidscreencast/>, Aug. 22, 2011, 2 pages.
Skurski et al., "VNC-based Remote Control for Symbian OS Smartphones", Retrieved from the Internet: URL: <https://ieeexplore.ieee.org/stamp/stamp.jsp?tp=&arnumber=5289469>, Copyright © 2009 by Department of Microelectronics & Computer Science, Technical University of Lodz, Jun. 25-27, 2009, pp. 171-174.
Teamviewer, "Remote Control your Samsung Android device with TeamViewer QuickSupport", Retrieved from the Internet: URL <https://www.youtube.com/watch?v=9ExNeQD1Dy8>, Aug. 15, 2012, Accessed on Jun. 6, 2019, 1 page.
Thomes et al., "Remote Ui: A High Performance Remote User Interface System for Mobile Consumer Electronics Devices", Retrieved from the Internet: URL:<https://ieeexplore.ieee.org/document/6162021/>, Proc. of IEEE International Conference on Consumer Electronics, Jan. 2012, pp. 10 pages.
Response to Pre-Interview First Office Action filed on Nov. 9, 2017, for U.S. Appl. No. 15/645,737, dated Oct. 19, 2017, 7 pages.
Non-Final Office Action received for U.S. Appl. No. 15/903,078, dated Mar. 30, 2018, 7 pages.
Notice of Allowance received for U.S. Appl. No. 15/903,078, dated Aug. 8, 2018, 6 pages.
Notice of Allowance received for U.S. Appl. No. 15/903,078, dated Oct. 22, 2018, 6 pages.
Notice of Allowance received for U.S. Appl. No. 15/903,078, dated Dec. 10, 2018, 6 pages.
Response to Non-Final Office Action filed on Jun. 29, 2018, for U.S. Appl. No. 15/903,078, dated Mar. 30, 2018, 5 pages.

\* cited by examiner

METHODS, APPARATUS AND SYSTEM FOR MOBILE PIGGYBACKING

CLAIM OF PRIORITY

This application is a continuation of and claims the benefit of priority to U.S. patent application Ser. No. 15/903,078, filed on Feb. 23, 2018, now U.S. Pat. No. 10/278,040, which is a continuation of and claims the benefit of priority to U.S. patent application Ser. No. 15/645,737, filed on Jul. 10, 2017, now U.S. Pat. No. 9,936,332, which is a continuation of and claims the benefit of priority to U.S. patent application Ser. No. 15/255,629, filed on Sep. 2, 2016, now U.S. Pat. No. 9,706,332, which is a continuation of and claims the benefit of priority to U.S. patent application Ser. No. 14/075,582, filed on Nov. 8, 2013, now U.S. Pat. No. 9,436,428, which claims the benefit of priority to U.S. Provisional Patent Application Ser. No. 61/724,180 filed Nov. 8, 2012, the benefit of priority of each of which is claimed hereby, and each of which are incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc., All Rights Reserved.

BACKGROUND

Mobile applications executing on portable computing devices (e.g., mobile phones, tablets, laptops, smart watches, and the like) are often streamlined versions of popular desktop applications or web services. These applications often feature larger graphics, simpler layout, and a more touch-friendly interface. Despite the focus on making these applications simpler, it is still possible for mobile users to have problems with the applications. These problems may include confusion over how to properly utilize the features of an application, application errors, or errors in communication between a mobile application and a network service (e.g., a network based marketplace).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
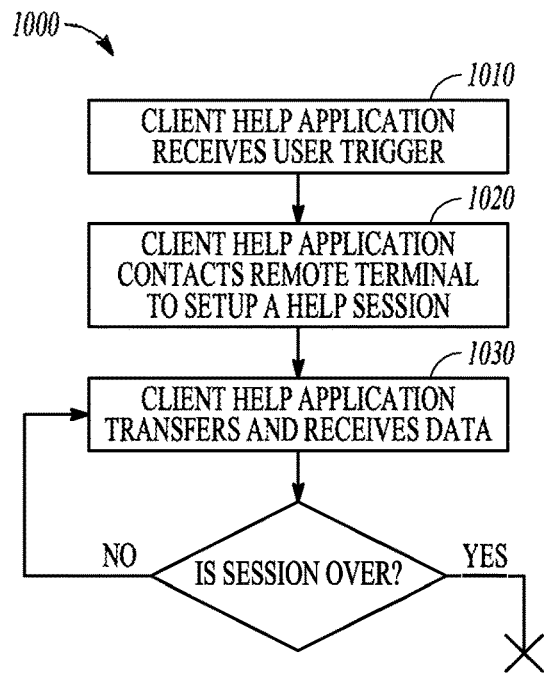
FIG. 1 illustrates a flowchart for an example client help application method, in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed in some examples is a system and method for allowing a customer support agent to view and/or control a mobile application from a remote terminal. A user encountering problems with a mobile application may trigger a client help application which allows a customer support agent to view, or in some examples, view and control, the application on the user's mobile device using a server help application. In one example embodiment, the customer support agent may converse with the user of the mobile application simultaneously over a voice connection on the mobile device.

The help system may allow the customer support agent to view the problem that the user is experiencing and, in one example embodiment, perform a particular action on behalf of the user. Since the customer support agent may also have access to any back-end data, the customer support agent may have a full-system view of the problem. For example, where the application on the mobile device is a client-server application, the customer support agent may be able to access the server-based portions of the application.

In one example embodiment, the system may have an emulator running at the remote terminal that may receive data from the mobile application and that may mimic the application state and/or screen display of the mobile application. This may allow the customer support agent to view the user's mobile application experience. The emulator may emulate the mobile application by obtaining state information from the mobile application running on the client device and/or by obtaining command information submitted to the mobile application running on the client device (by, for example, a user of the client device). In one example embodiment, the emulator may emulate the mobile application by processing screen shots from the client device to determine the state of the mobile application running on the client device and/or by processing screen shots received from the client device to determine inputs (e.g., commands) provided to the mobile application running on the client device.

In one example embodiment, the system may have an emulator running at the remote terminal that may receive data from the mobile application and that may mimic the application state and screen display of the mobile application. This may allow the customer support agent to view the user's mobile application experience.

The customer support agent may issue commands to the mobile application on the mobile device. The commands may include inputting information to various user input fields, executing actions on behalf of the user, and the like. Commands may be entered by the customer support agent using a variety of different techniques. For example, the remote terminal may specify that certain mouse clicks, keyboard keys, touch screen inputs, drop down menus, command line interfaces, button presses, and the like initiate certain commands to be executed by the mobile application.

In one example embodiment, the client help application may be part of the mobile application itself. For example, the client help application may be a module or component of the software that the user is having trouble with and for which help is desired. In one example embodiment, the help application may be deployed to the mobile device and may process the screen captures (or intercept the screen commands, or otherwise send data about the state of the device to allow for viewing of the user's mobile application experience), and may inject commands into the mobile device at the request of the customer service agent at the remote terminal without being integrated into the mobile application. For example, the client help application may be a separate application, may be integrated into the operating system of the mobile device, and the like. The client help application may allow for helping users with multiple different applications. For descriptive convenience, the client help functionality will be referred to herein as the client help application regardless of whether it is part of another application or a stand-alone application.

Activating remote support using the client help application may be initiated in a variety of ways. In one example embodiment, various buttons and user input dialogues may be embedded in the mobile application to enable users to launch the remote help features. The user may access the help functionality via a gesture, a universal "hot spot" on the screen (e.g., holding a finger on a particular spot on the screen for more than a predefined time period to initiate help, or similar methods), a particular input into an accelerometer on the device (e.g., shaking the device in a certain manner or fashion), voice input (e.g., speaking "help" into the speaker of the device), automatically upon an application error, selection from a menu, launching an application, or the like.

In addition to being able to view the screen of the user and control the screen, the application may also send application state information and device state information to the remote terminal for viewing by the customer agent. Example device state information may include a memory dump (e.g., a stack or heap dump or trace), a list of the various processes running in memory on the mobile device (and associated data about those processes such as CPU utilization, memory allocation, memory addresses, execution parameters, and the like), operating system information, wireless data information (e.g., bandwidth, carrier, connection type, or the like), display screen information (e.g., resolution, etc.), device identifier (e.g., UDID), network traces, Wireless network information (e.g., cell or WiFi), or any other device information. Example application state information may include user preference information (e.g., user's language, a preferred network marketplace online site, user identification information, locale settings, time zone settings), application state information, application memory contents, the application's program counter, and the like.

The above example embodiments may be beneficially employed in a variety of mobile application environments. One example environment may include an online marketplace application. For example, the eBay mobile application developed by eBay, Inc. of San Jose, Calif., which allows users to buy and sell items on the eBay online marketplace from their mobile device.

FIG. 1 illustrates a flowchart for an example client help application method 1000, in accordance with an example embodiment. In one example embodiment, the client help application receives a user trigger to start the help process (operation 1010). As already noted, in some examples, this may be done through a gesture, a motion, or some other user input. The client help application may be integrated with the mobile application on which the user is experiencing difficulty. The client help application on the user's mobile device may contact the server help application on the remote terminal to set up a help session (operation 1020). While in these examples the user activated the client help application that initiated the help session with the remote terminal, in one example embodiment, the remote terminal may initiate the help session. The client help application begins to transfer data, which enables the server help application executing on the remote terminal to view a representation of the user's screen (operation 1030). Additionally, at operation 1030, the client help application may receive data indicating one or more actions to execute on behalf of the user that are sent from the server help application executing on the remote terminal. The exchange of information between the client help application and the server help application may continue until the help session is terminated by either the user at the mobile device or by the remote terminal. In an example embodiment, the client help application may send device or application information along with the information used to view the representation of the user's screen.

Figure 2:
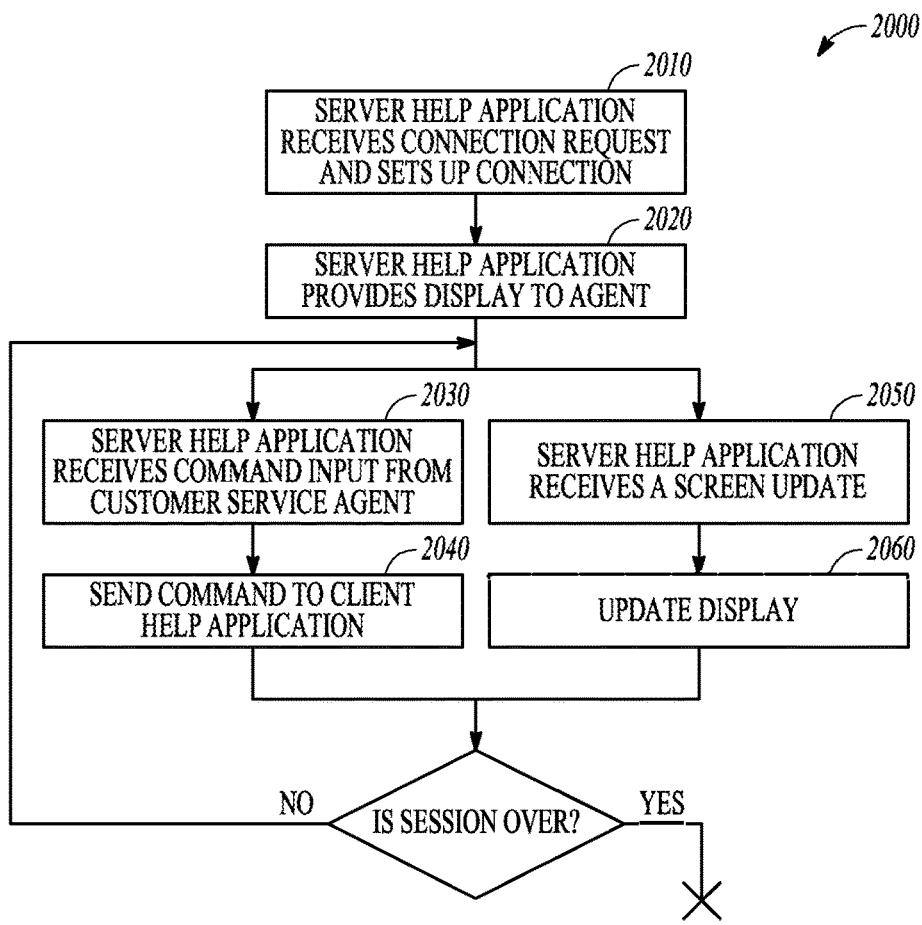
FIG. 2 illustrates a flowchart for an example server help application method, in accordance with an example embodiment.

FIG. 2 illustrates a flowchart for an example server help application method 2000, in accordance with an example embodiment. In one example embodiment, the server help application receives a connection request from a client help application (operation 2010). In some examples in which the client help software is not specific to a particular application, the client help software may indicate which software the user is having difficulty with and needs support with. For example, the client help software may indicate which software the user is having difficulty with in the connection request.

In one example embodiment, the services of a customer support agent may be secured and the establishment of a voice communication session may be obtained automatically as part of establishing a connection between the customer support agent and the user. In one example embodiment, the voice session may be on the same mobile device as the application for which the user is requesting assistance. The server help software negotiates the screen capture parameters and captures a screen shot (or other data which allows for the creation of a representation of the screen of the application or of the mobile device) from the client help software and displays it to the customer support agent (operation 2020). The server help application may receive input from the customer support agent indicating that the customer support agent wishes to perform an action on the mobile device (operation 2030). In response to receiving the input from the customer support agent, the server help application may send the command to the client help application and the client help application may execute the command (operation 2040). For example, the client help application may emulate certain keyboard keystrokes and mouse actions to execute the command.

At operation 2050, the server help application may receive a screen update from the client help application. The server help application may update the screen for the customer support agent (operation 2060). The server help application method 2000 may repeat operations 2030-2060 while the session is active. Once the session is terminated, the server help application method 2000 may terminate. In one example embodiment, operations 2030-2040 may be executed in serial or parallel with operations 2050-2060. For example, the screen updates for the remote terminal and the command execution for the mobile application may be performed simultaneously or nearly simultaneously.

It will be appreciated that various confirmation prompts and security techniques (e.g., encryption) may be utilized to prevent an attacker from utilizing these techniques for improper purposes.

Figure 3:
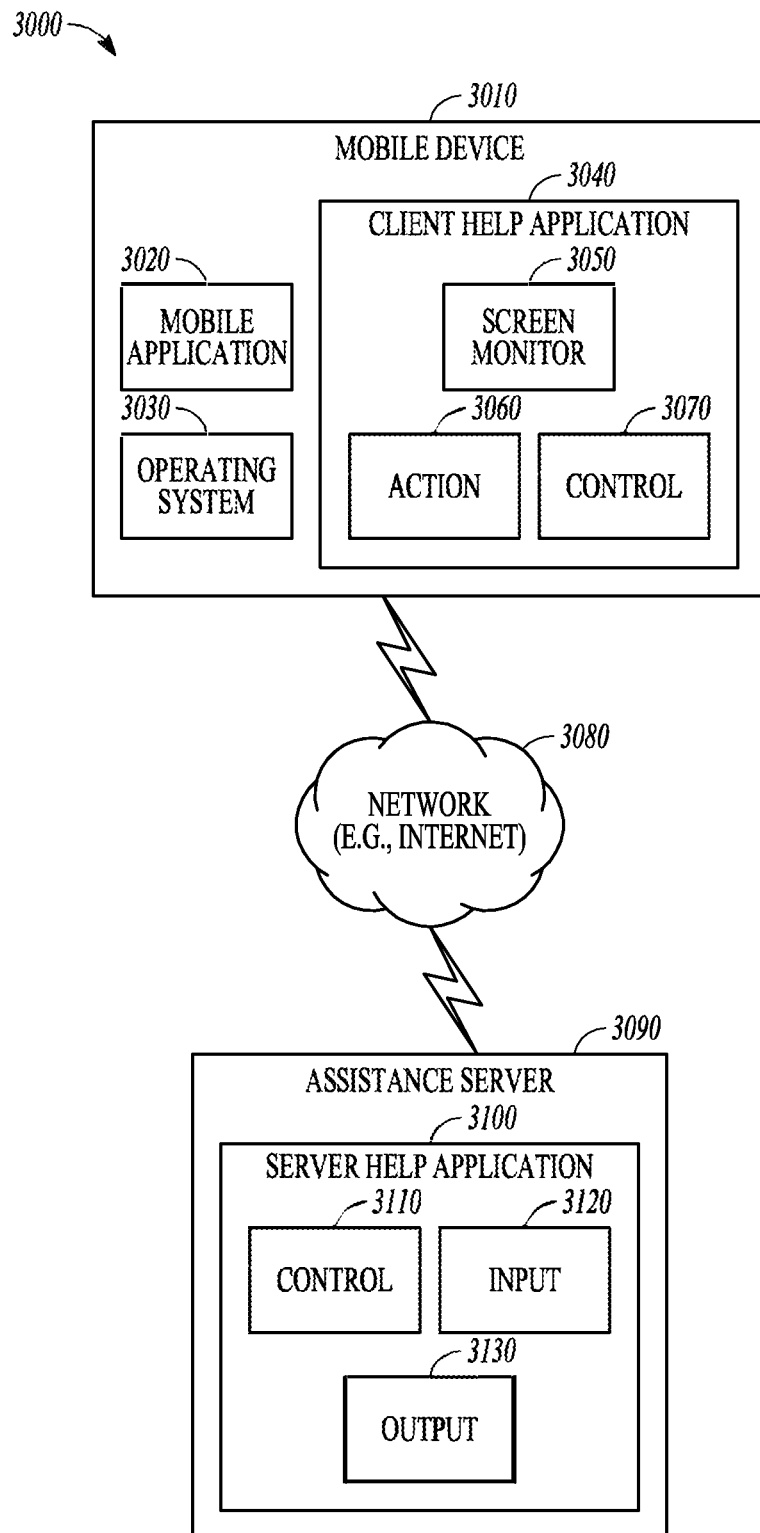
FIG. 3 shows a block diagram of an example help system, in accordance with an example embodiment.

FIG. 3 shows a block diagram of an example help system 3000, in accordance with an example embodiment. A mobile device 3010 may include one or more mobile applications 3020 that the user may need assistance with. The mobile device 3010 may also include a device operating system 3030 that interfaces and manages the hardware of the mobile device 3010 and provides common services for the various mobile applications 3020. The mobile device 3010 may have a client help application 3040. The client help application 3040 may include a screen monitor module 3050 which may be responsible for collecting data to send to a server help application 3100 to update the server help application 3100's screen. As described more fully above, in one example embodiment, this may be performed by periodically capturing screen shots by, for example, accessing the screen graphics buffer using the operating system 3030. In one example embodiment, the client help application 3040 may snoop on the calls to the graphics subroutines of the operating system 3030. The client help application 3040 may also contain an action module 3060 that may receive and process actions sent from the server help application 3100 which are to be executed. In one example embodiment, the action module 3060 may inject one or more user inputs or actions using the operating system 3030. For example, simulated touches, clicks, button presses, or the like may be injected into the operating system 3030. In one example embodiment, the action module 3060 may access and change application data from the mobile application 3020.

A control module 3070 may coordinate the activities of the client help application 3040 and may be responsible for establishing a connection with the server help application 3100.

The client help application 3040 may communicate with a server help application 3100 executing on one or more remote terminals (that are a component of assistance server 3090) over a network 3080. The mobile device 3010 may access the network 3080 in a variety of ways including wired connections (such as Ethernet or dial-up modem), wireless connections (2G, 3G, 4G cellular, WiFi, Bluetooth, or the like), and the like. The network 3080 may be or include portions of one or more of: the Internet, a Local Area Network (LAN), a Wide Area Network (WAN), a cellular network, a Plain Old Telephone (POTS) network, and the like.

The server help application 3100 may include a control module 3110 which may facilitate the establishment of a connection with the client help application 3040 and may provide the simulated display of the mobile device 3010 to one or more customer service agents at one or more remote terminals (assistance server) 3090. The control module 3110 may receive screen information (or other information which may be used to reproduce the display of the mobile device 3010 at the remote terminal (assistance server) 3090) from the client help application 3040 and instruct the output module 3130 to display the information. The control module 3110 may also receive input through the input module 3120 from one or more of the customer service agents which utilize one or more of the features of the server help application 3100. The control module 3110 may process this input and execute one or more instructions in response. As described above, in one example embodiment, these instructions cause the execution of one or more commands on the mobile device 3010. The control module 3110 may pass the commands to the action module 3060 of the client help application 3040 for execution via the output module 3130. An input module 3120 and the output module 3130 communicate with client help application 3040 over network 3080.

Figure 4:
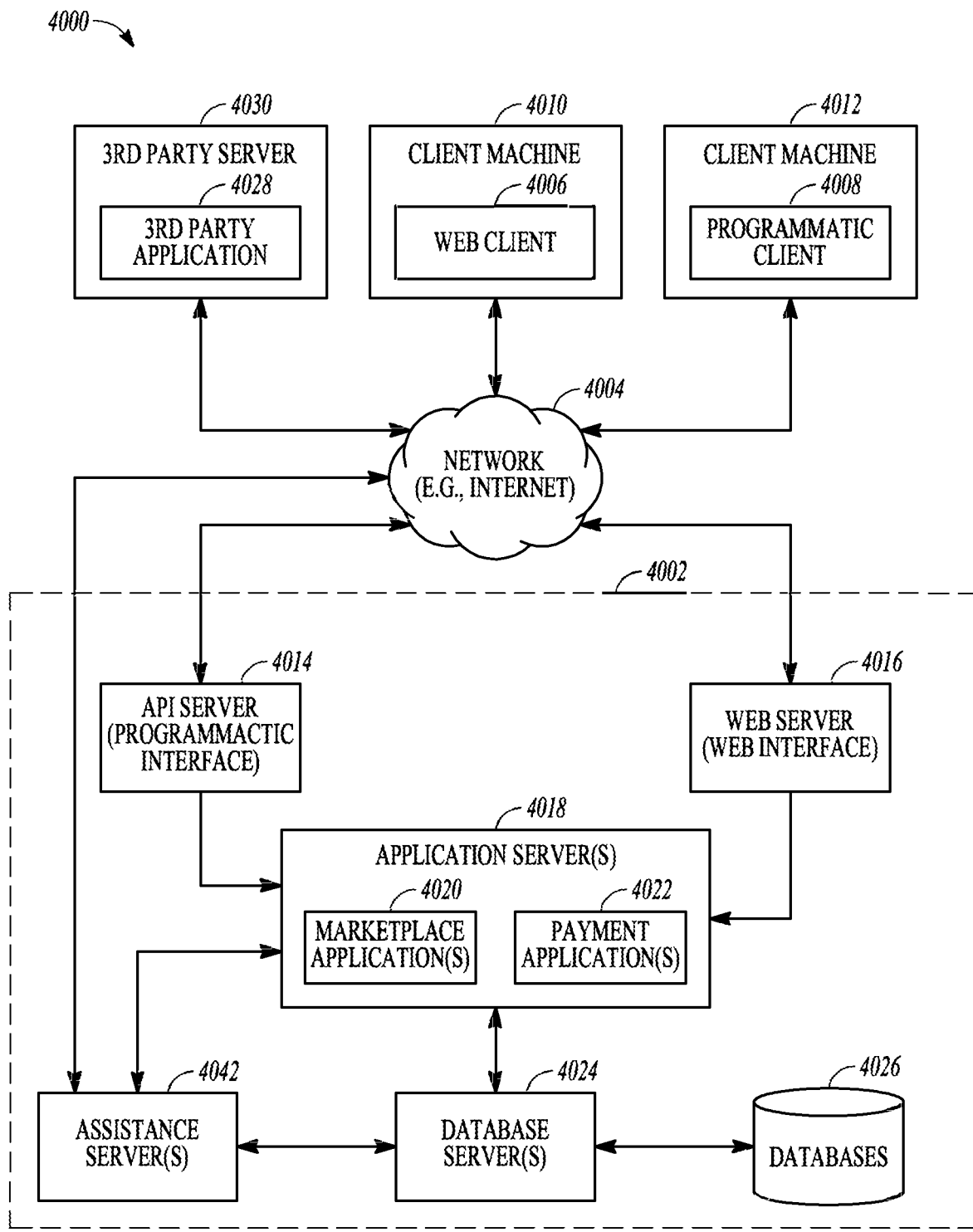
FIG. 4 shows a block diagram of an example network-based system, in accordance with an example embodiment.

FIG. 4 shows a block diagram of an example network-based system 4000, in accordance with an example embodiment. A networked system 4002, in the example forms of a network-based marketplace or publication system, provides server-side functionality, via a network 4004 (e.g., the Internet or Wide Area Network (WAN)) to one or more clients. FIG. 4 illustrates, for example, a web client 4006 (e.g., a browser, such as the Internet Explorer browser developed by Microsoft Corporation of Redmond, Washington State), and a programmatic client 4008 executing on respective client machines 4010 and 4012.

An Application Program Interface (API) server 4014 and a web server 4016 are coupled to, and provide programmatic and web interfaces respectively to, one or more application servers 4018. The application servers 4018 host one or more marketplace applications 4020 and payment applications 4022. The application servers 4018 are, in turn, shown to be coupled to one or more database servers 4024 that facilitate access to one or more databases 4026.

The marketplace applications 4020 may provide a number of marketplace functions and services to users that access the networked system 4002. For example, the marketplace applications 4020 may provide one or more background images. The payment applications 4022 may likewise provide a number of payment services and functions to users. The payment applications 4022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 4020. While the marketplace and payment applications 4020 and 4022 are shown in FIG. 4 to both form part of the networked system 4002, it will be appreciated that, in alternative embodiments, the payment applications 4022 may form part of a payment service that is separate and distinct from the networked system 4002.

Further, while the network-based system 4000 shown in FIG. 4 employs a client-server architecture, the embodiments of the present invention are not limited to such an architecture, and could equally well find application in a distributed, or peer-to-peer, architecture system, for example. The various marketplace and payment applications 4020 and 4022 could also be implemented as standalone software programs, which do not necessarily have networking capabilities.

The web client 4006 accesses the various marketplace and payment applications 4020 and 4022 via the web interface supported by the web server 4016. Similarly, the programmatic client 4008 accesses the various services and functions provided by the marketplace and payment applications 4020 and 4022 via the programmatic interface provided by the API server 4014. The programmatic client 4008 may, for example, be a seller application (e.g., the TurboLister application developed by eBay Inc., of San Jose, Calif.) to enable sellers to author and manage listings on the networked system 4002 in an off-line manner, and to perform batch-mode communications between the programmatic client 4008 and the networked system 4002. In other examples, the client machines 4010, 4012 may be buyer machines which access the networked system 4002 to buy products.

FIG. 4 also illustrates a third party application 4028, executing on a third party server machine 4030, as having programmatic access to the networked system 4002 via the programmatic interface provided by the API server 4014. For example, the third party application 4028 may, utilizing information retrieved from the networked system 4002, support one or more features or functions on a website hosted by the third party. The third party website may, for example, provide one or more promotional, marketplace or payment functions that are supported by the relevant applications of the networked system 4002.

Also shown in FIG. 4 are one or more assistance servers 4042 which may execute one or more server help applications (e.g., such as server help application 3100 described more fully above in conjunction with FIG. 3) which may be in communication with one or more of the third party server machines 4030, the client machine 4010, the client machine 4012 or some other machine on which the client help application (e.g., client help application 3040 from FIG. 3) may execute. In addition, the assistance servers 4042 may have access to the marketplace and payment applications 4020, 4022 either directly or through the API or Web Server 4014, 4016 interfaces. The assistance servers 4042 may also directly access the database servers 4024 to allow the assistance servers 4042 access to account information about the user of the application to which assistance is being given. In this way, the customer service agent may be able to take action on behalf of the user on both the mobile application side as well as the network marketplace side. For example, the customer service agent may place bids or orders, refund money, process payments, list items, cancel item listings, process bids, process sales, or any other action associated with the networked system 4002. While the assistance servers 4042 are shown in FIG. 4 as part of the networked system 4002, in other examples, the assistance servers 4042 may be external to the networked system 4002 and may access the networked system 4002 through the API server 4014 or Web server 4016.

Figure 5A:
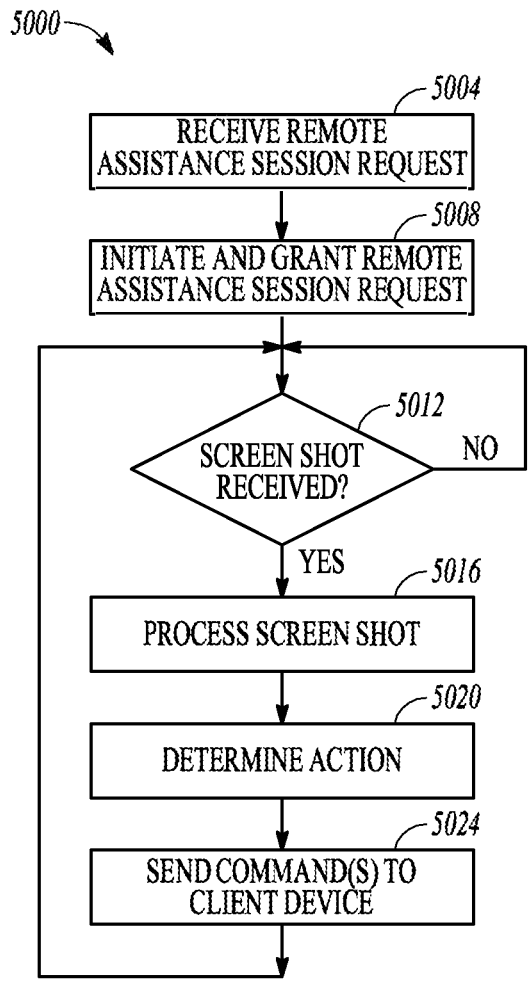
FIG. 5A shows a flowchart for an example method for assisting a customer support agent in providing customer support, in accordance with an example embodiment.

FIG. 5A shows a flowchart for an example method 5000 for assisting a customer support agent in providing customer support, in accordance with an example embodiment. In one example embodiment, one or more of the operations of the method 5000 may be performed by one or more of the assistance servers 4042.

In one example embodiment, a request for a remote assistance session may be received (operation 5004). For example, a request for a remote assistance session may be received from the client machine 4010 or the client machine 4012. The remote assistance session may be granted and initiated (operation 5008). For example, a connection between the assistance server 4042 and the requesting client machine may be established via the network 4004, and a thread corresponding to one remote assistance session may be created.

A test may be performed to determine if a captured screen shot has been received (operation 5012). For example, a captured screen shot may be received from web client 4006. If a captured screen shot has not been received, the method may repeat operation 5012; otherwise, the received screen shot may be processed and may be displayed to the customer support agent (operation 5016). In addition, optical character recognition may be performed on the captured screen shot to identify the current state of the client application.

Based on the information provided by the captured screen shot, one or more actions may be determined (operation 5020). For example, if a user has not properly entered user identification information, an email address and the like, the customer support agent may determine that the correct information should be entered on behalf of the user. In one example embodiment, the assistance server 4042 may automatically determine a course of action. For example, the assistance server 4042 may determine that an email address entered by a user is incorrect and may determine that the correct email address should be entered on behalf of the user.

In one example embodiment, one or more commands to execute the determined action(s) may be generated and issued. For example, commands corresponding to certain keyboard keystrokes and mouse actions for entering an email address may be generated and sent to the client machine 4010.

Figure 5B:
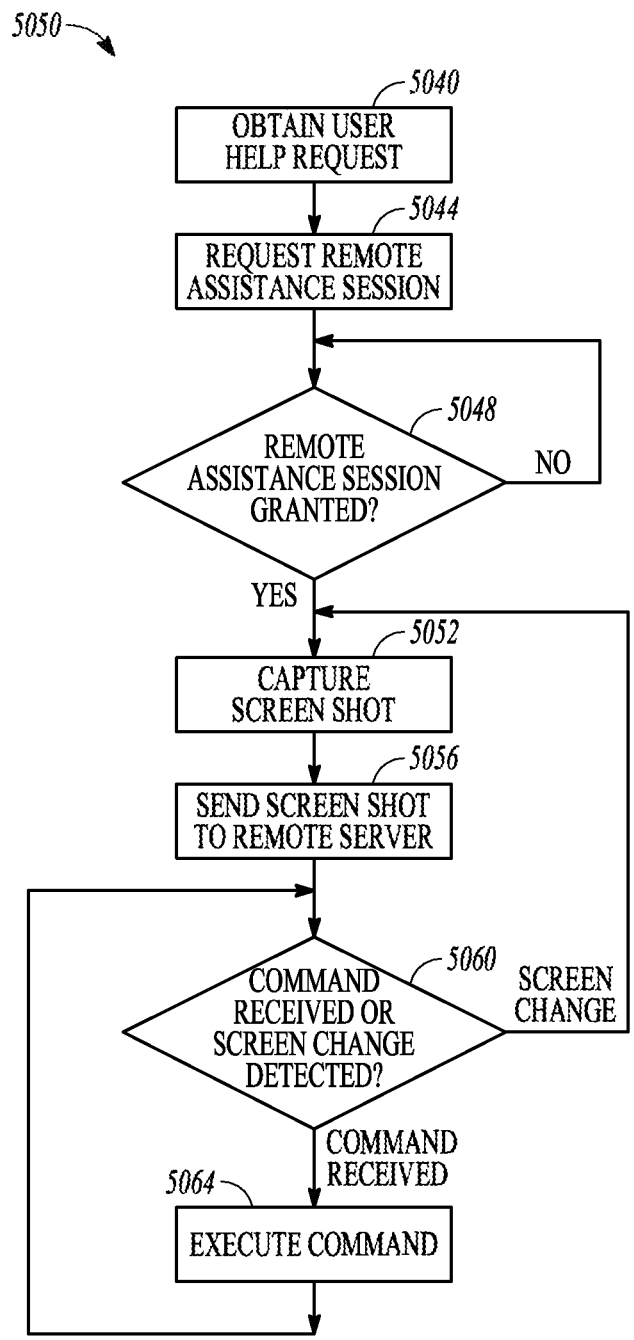
FIG. 5B shows a flowchart for an example method for providing customer agent support to a user, in accordance with an example embodiment.

FIG. 5B shows a flowchart for an example method 5050 for providing customer agent support to a user, in accordance with an example embodiment. In one example embodiment, one or more of the operations of the method 5050 may be performed by one or more of the client machines 4010, 4012.

In one example embodiment, a request for a remote assistance session may be received from a user (operation 5040). For example, a request for a remote assistance session may be received from a user at the client machine 4010 or the client machine 4012. The request for a remote assistance session may be issued (operation 5044). For example, a request for a remote assistance session may be issued to the assistance server 4042.

A test may be performed to determine if a remote assistance session has been granted (operation 5048). For example, a remote assistance session may be granted by the assistance server 4042. If a remote assistance session has not been granted, the method may repeat operation 5048; otherwise, a screen shot may be captured (operation 5052) and sent to the assistance server 4042 (operation 5056).

A test may be performed to determine if a command has been received or a screen change has been detected (operation 5060). If a screen change has been detected, the method 5050 may proceed with operation 5052. If a command has been received, for example, from the assistance server 4042, the command may be executed (operation 5064). The method 5050 may then proceed with operation 5060.

Figure 6:
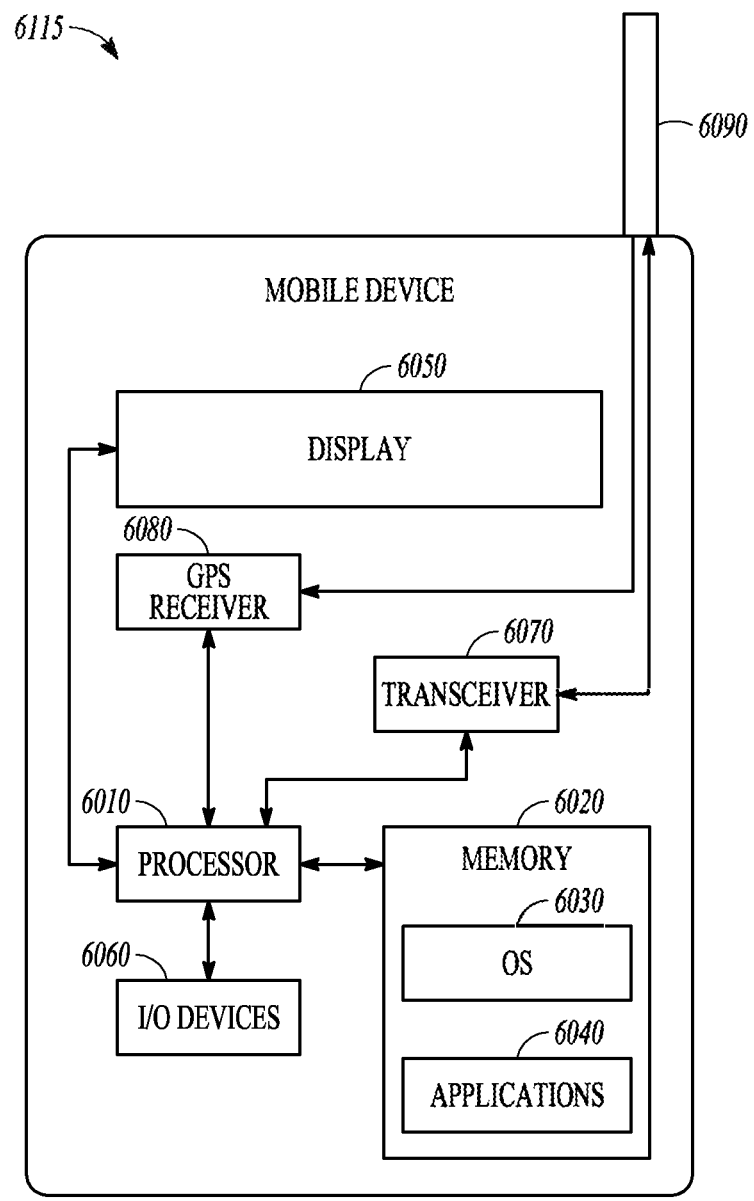
FIG. 6 shows a block diagram of an example mobile device, in accordance with an example embodiment.

FIG. 6 is a block diagram illustrating an example mobile device 6115, according to an example embodiment, upon which various embodiments may execute. For example, the applications and functionality described in the mobile device 3010 of FIG. 3 may be executed on a mobile device, such as the mobile device 6115. The mobile device 6115 may include a processor 6010. The processor 6010 may be any of a variety of different types of commercially available processors suitable for mobile devices (for example, an XScale architecture microprocessor, a Microprocessor without Interlocked Pipeline Stages (MIPS) architecture processor, a processor operating according to a Reduced Instruction Set (RISC) such as a PowerPC or Advanced RISC Machine (ARM) processor, a processor operating according to a Complex instruction Set (CISC) such as an Intel x086 processor, or another type of processor). A memory 6020, such as a Random Access Memory (RAM), a Flash memory, or other type of memory, may be communicatively coupled to the processor 6010 (e.g., through a bus or other communication pipeline). The memory 6020 may be adapted to store an operating, system (OS) 6030, as well as application programs 6040, such as an application which allows users to create final product images according to the present disclosure. Example operating systems include the Android OS developed by Google Inc., of Mountain View Calif., iOS developed by Apple of Cupertino, Calif., Windows Mobile developed by Microsoft Corp., of Redmond Wash., or the like. The processor 6010 may be coupled, either directly or via appropriate intermediary hardware, to a display 6050 and to one or more input/output (I/O) devices 6060, such as a keypad, a touch panel sensor, a microphone, and the like. For example, the mobile device 6115 may include multi-touch-screen displays which support input entry through multi-touch gestures. Example multi-touch screen displays include capacitive touch screen displays, resistive touch screen displays, and the like, Similarly, in some embodiments, the processor 6010 may be coupled to a transceiver 6070 that interfaces with an antenna 6090. The transceiver 6070 may be configured to both transmit and receive cellular network signals, wireless data signals, or other types of signals via the antenna 6090, depending on the nature of the mobile device 6115. In this manner, a connection with a communication network may be established. For example, the transceiver 6070 may operate in accordance with a $2^{nd}$ Generation wireless network (e.g., a Global System for Mobile Communications GSM network, a General Packet Radio Service GPRS network), a $3^{rd}$ Generation wireless network (e.g., a Universal Mobile Telecommunications Network UMTS), a $4^{th}$ Generation wireless network (e.g., Long Term Evolution LTE, Long Term Evolution-Advanced LTE-A), a network according to an Institute for Electrical and Electronics Engineers IEEE 802.11 family of standards (such as 802.11n) or the like. Further, in some configurations, a Global Positioning System (GPS) receiver 6080 may also make use of the antenna 6090 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
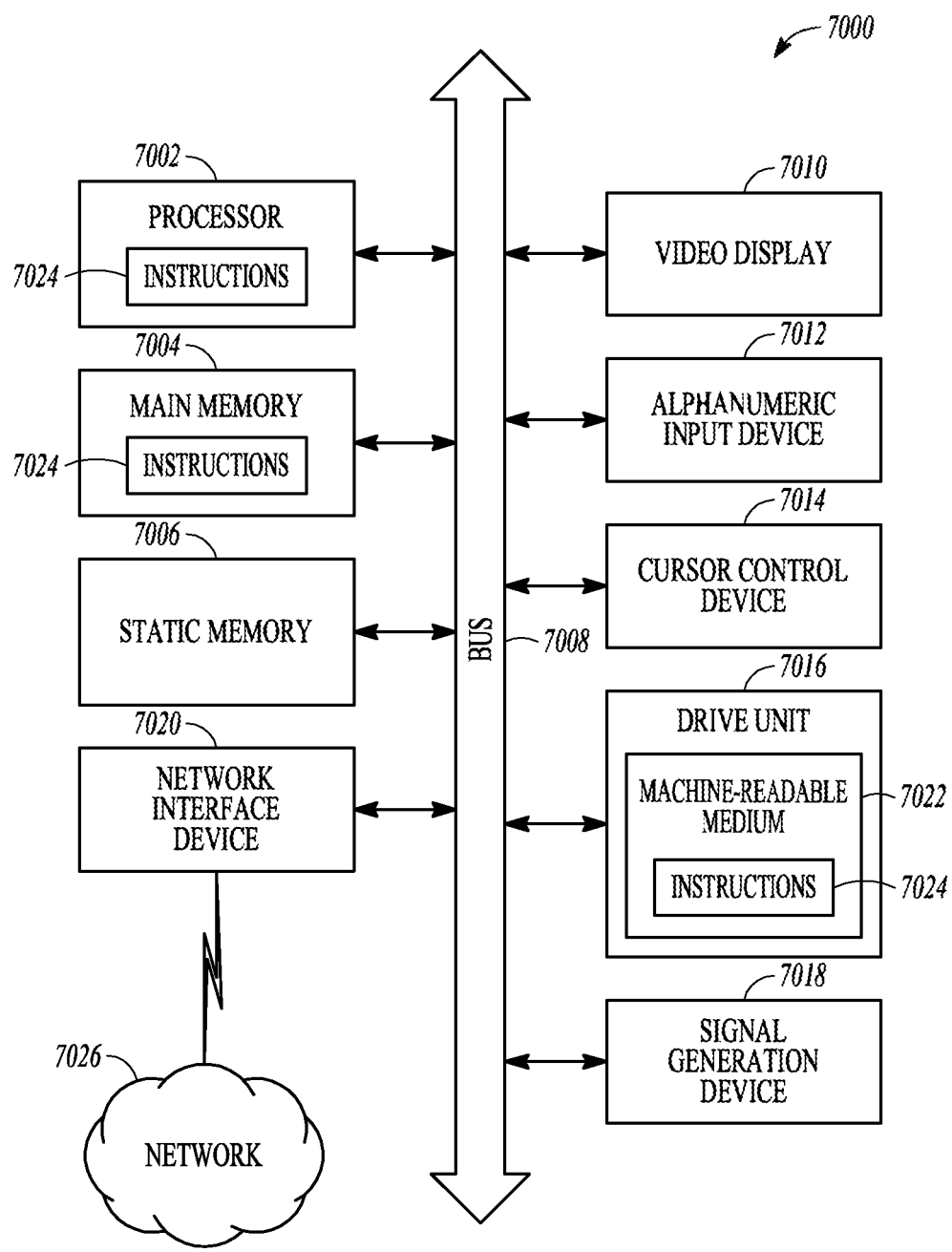
FIG. 7 is a block diagram of a machine within which instructions may be executed for causing the machine to perform any one or more of the methodologies discussed herein.

FIG. 7 is a block diagram of machine in the example form of a computer system 7000 within which instructions 7024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 7000 includes a processor 7002 (e.g., a central processing unit (CPU), a graphics processing unit (GPU) or both), a main memory 7004 and a static memory 7006, which communicate with each other via a bus 7008. The computer system 7000 may further include a video display unit 7010 (e.g., a liquid crystal display (LCD) or a cathode ray tube (CRT)). The computer system 7000 also includes an alphanumeric input device 7012 (e.g., a keyboard), a user interface (UI) navigation (or cursor control) device 7014 (e.g., a mouse), a disk drive unit 7016, a signal generation device 7018 (e.g., a speaker) and a network interface device 7020.

Machine-Readable Medium

The disk drive unit 7016 includes a machine-readable medium 7022 on which is stored one or more sets of data structures and instructions 7024 (e.g., software) embodying or used by any one or more of the methodologies or functions described herein. The instructions 7024 may also reside, completely or at least partially, within the main memory 7004, static memory 7006, and/or within the processor 7002 during execution thereof by the computer system 7000, the main memory 7004 and the processor 7002 also constituting machine-readable media.

While the machine-readable medium 7022 is shown in an example embodiment to be a single medium, the term "machine-readable medium" may include a single medium or multiple media (e.g., a centralized or distributed database, and/or associated caches and servers) that store the one or more instructions 7024 or data structures. The term "machine-readable medium" shall also be taken to include any tangible medium that is capable of storing, encoding or carrying instructions (e.g., instructions 7024) for execution by the machine and that cause the machine to perform any one or more of the methodologies of the present inventive subject matter, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks. magneto-optical disks; and CD-ROM and DVD-ROM disks.

Transmission Medium

The instructions 7024 may further be transmitted or received over a communications network 7026 using a transmission medium. The instructions 7024 may be transmitted using the network interface device 7020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, at a server, a request to establish a connection from a single mobile application executing on a mobile device;
   transmitting, using the server, information received from the single mobile application to a remote device, the information including information about the single mobile application and not including information of another application on the mobile device;
   receiving, using the server, a command from the remote device, the command being based on an emulation of the single mobile application by the remote device; and
   sending, using the server, the command to the single mobile application.

2. The method of claim 1, wherein the information includes content of a display of the single mobile application.

3. The method of claim 1, wherein the single mobile application calls an API to establish a Previously Presented session.

4. The method of claim 1, wherein the information is encrypted.

5. The method of claim 1, further comprising receiving a termination of the session from the mobile device.

6. The method of claim 1, further comprising transmitting, using the server, the information received from the single mobile application to a second remote device that is different from the remote device.

7. The method of claim 1, wherein the mobile device utilizes a first operating system and the remote device utilizes a second operating system that is different than the first operating system.

8. The method of claim 1, further comprising initiating a voice communication session with the remote device in response to sending the information to the remote device.

9. A system, comprising:
   at least one processor; and
   a memory coupled to the at least one processor and storing instructions that, when executed by the at least one processor, perform operations, comprising:
   receiving a request to establish a connection from a single mobile application executing on a mobile device;
   transmitting information received from the single mobile application to a remote device, the information including information about the single mobile application and not including information of another application on the mobile device;
   receiving a command from the remote device, the command being based on an emulation of the single mobile application by the remote device; and
   sending the command to the single mobile application.

10. The system of claim 9, wherein the information includes content of a display of the single mobile application.

11. The system of claim 9, wherein the single mobile application calls an API to establish a new session.

12. The system of claim 9, wherein the information is encrypted.

13. The system of claim 9, further comprising instructions for receiving a termination of the session from the mobile device.

14. The system of claim 9, further comprising instructions for transmitting the information received from the single mobile application to a second remote device that is different from the remote device.

15. The system of claim 9, wherein the mobile device utilizes a first operating system and the remote device utilizes a second operating system that is different than the first operating system.

16. The system of claim 9, further comprising instructions for initiating a voice communication session with the remote device in response to sending the information to the remote device.

17. A method comprising:
receiving, from a single mobile application executing on a computing device, a request to establish a connection;
receiving information about the single mobile application once the connection is established;
transmitting the received information to a remote device that emulates the single mobile application;
receiving a command from the remote device, the command to be executed by the single mobile application; and
sending the command to the single mobile application executing on the computing device.

18. The method of claim 17, wherein the information includes content of a display of the single mobile application.

19. The method of claim 17, wherein the single mobile application calls an API to establish a new session.

20. The method of claim 17, wherein the information is encrypted.

* * * * *